(12) United States Patent
Harel et al.

(10) Patent No.: US 7,090,809 B2
(45) Date of Patent: Aug. 15, 2006

(54) PRODUCTION OF ALUMINUM COMPOUNDS AND SILICA FROM ORES

(75) Inventors: Simcha Harel, Jerusalem (IL); Lev Shapira, Be'er Sheva (IL)

(73) Assignee: ATI-Aluminum Technologies Israel Ltd., Jerusalem (IL)

( * ) Notice: Subject to any disclaimer, the term of this patent is extended or adjusted under 35 U.S.C. 154(b) by 395 days.

(21) Appl. No.: 10/451,919

(22) PCT Filed: Dec. 27, 2001

(86) PCT No.: PCT/IL01/01210

§ 371 (c)(1),
(2), (4) Date: Jun. 27, 2003

(87) PCT Pub. No.: WO02/053500

PCT Pub. Date: Jul. 11, 2002

(65) Prior Publication Data

US 2004/0047791 A1    Mar. 11, 2004

(30) Foreign Application Priority Data

Dec. 31, 2000   (IL)   ..................................... 140646
Jun. 27, 2001   (IL)   ..................................... 144038

(51) Int. Cl.
*C01F 7/50*   (2006.01)
*C01F 7/20*   (2006.01)
*C01F 7/74*   (2006.01)

(52) U.S. Cl. ........................ 423/111; 423/116; 423/117; 423/131; 423/132; 423/336; 423/489; 423/556; 423/327.1; 423/342

(58) Field of Classification Search ................ 423/111, 423/116, 131, 132, 335, 336, 489, 544, 556, 423/117, 327.1, 328.1, 342
See application file for complete search history.

(56) References Cited

U.S. PATENT DOCUMENTS

| 2,842,426 | A |   | 7/1958  | Glocker |
|---|---|---|---|---|
| 3,961,030 | A | * | 6/1976  | Wiewiorowski et al. ..... 423/126 |
| 3,965,248 | A | * | 6/1976  | Wiewiorowski et al. ..... 423/489 |
| 4,013,754 | A | * | 3/1977  | Stauter et al. ................. 423/27 |
| 4,539,187 | A | * | 9/1985  | Russ et al. ................... 423/132 |
| 4,804,390 | A | * | 2/1989  | Lloyd et al. ................... 44/621 |
| 5,242,670 | A | * | 9/1993  | Gehringer ................... 423/342 |
| 5,993,758 | A |   | 11/1999 | Nehari et al. |

OTHER PUBLICATIONS

Encyclopedia Kirk-Othmer—Aluminum Compounds (vol. 2 pp. 252-271;337).
Ullman—Aluminum Compounds, Inorganic (vol. A 1 pp. 527-535).

* cited by examiner

*Primary Examiner*—Ngoc-Yen Nguyen
(74) *Attorney, Agent, or Firm*—Mark M. Friedman

(57) ABSTRACT

A method for the production of inorganic aluminum substances and amorphous silica from aluminum oxide containing ores, comprising: (a) leaching of said ores with fluorosilicic acid to obtain aluminum fluosilicate solution; (b) filtering said leached solution from insoluble materials; and (c) washing said insoluble materials.

15 Claims, 1 Drawing Sheet

PRODUCTION OF ALUMINUM COMPOUNDS AND SILICA FROM ORES

FIELD OF THE INVENTION

The invention relates to a method for the production of inorganic aluminum compounds and silica from ores comprising aluminum oxide and silica. More specifically the invention relates to a method for the production of aluminum compounds from clays, bauxite, coal ash and other ores containing aluminum oxide

BACKGROUND OF THE INVENTION

Bauxite and calcinated kaolin are the main minerals used for the production of aluminum oxide (alumina) and aluminum salts. Various methods are known in the art for carrying out this procedure, and some of them are described in Encyclopedia Kirk-Othmer (Volume 2; pages 252–271; 337) and Ullman (Volume A1, page 527–535).

The Bayer process is a traditional technology known for extracting aluminum hydroxide from bauxite by using caustic soda under pressure. This process comprises more than 15 stages and is a costly process. One problem with the aluminum sulfate produced from bauxite and kaolin, which is used mostly for the purification of water, is that it contains 0.3% to 0.8% $Fe_2O_3$ (Chemical Economics Handbook 1998). Hence, for the production of iron free aluminum sulfate of less than 100 ppm $Fe_2O_3$, which is used for example in the paper industry, pure aluminum hydroxide must be used. Many methods are known for extracting aluminum hydroxide from bauxite and from clay. Those from clay require a calcination step of considerably high temperature, usually higher than 1,100° C.

The Bayer process using bauxite for the production of aluminum hydroxide is known for 120 years. This process however, is very complicated and costly. Recently published, namely U.S. Pat. No. 5,993,758 to Nehari dated 1999, describes a process for the recovery of alumina and silica from aluminosilicate. This process comprises the steps of (a) heating the aluminosilicate to approximately 1000° C. with hydrated $CaCl_2$ to obtain calcium-alumino-silicate and calcium-aluminate products, wherein the $CaCl_2$ is substantially free of $MgCl_2$; (b) leaching the products with HCl to form a solution comprising $AlCl_3$ and $CaCl_2$, and insoluble silica; (c) separating the insoluble silica from the solution; and (d) crystallizing $AlCl_3$ from the solution and recovering the alumina from the crystallized $AlCl_3$.

The process may further comprise the steps of: (e) substantially removing $MgCl_2$ from the $CaCl_2$ solution of step (d); and (f) recycling the $CaCl_2$ solution for use in step (a). It is thus clear that the drawback of aforementioned process is costly. Thus, a more cost-effective process would therefore be beneficial for the recovery of alumina and silica from materials containing alumino-silicates. This process should avoid both calcination steps at high temperature, and further, should be insensitive to iron contamination in the process.

SUMMARY OF THE INVENTION

It is the object of the present invention to provide an improved method for the production of inorganic aluminum substances and amorphous silica from aluminum oxide containing ores, comprising: (i) leaching of said ores with fluorosilicic acid to obtain aluminum fluosilicate solution; (ii) filtering said leached solution from insoluble materials; and (iii) washing said insoluble materials.

In one preferred embodiment of the present invention is the method defined above, further comprising defluorinating said aluminum fluosilicate by heating it with sulfuric acid.

In another preferred embodiment of the present invention is the method defined above, useful for aluminum fluoride production, further comprising boiling said aluminum fluosilicate solution to obtain aluminum fluoride.

In another preferred embodiment of the present invention is the method defined above, wherein said aluminum oxide containing ores are selected from clays, coal ash and bauxite.

In another preferred embodiment of the present invention is the method defined above, wherein said leaching is performed at a temperature range of 40° C. to 80° C. Still according to the present invention, is the method defined above, wherein said leaching is performed preferably at the temperature range of 60° C. to 70° C.

In another preferred embodiment of the present invention is the method defined above wherein said insoluble materials are silica, ferric oxide and part of the alumina, which did not dissolve in the process.

In another preferred embodiment of the present invention is the method defined above wherein the fluosilicic acid fed to the leaching stage is at a concentration range of 10% to 30%.

In another preferred embodiment of the present invention is the method defined above wherein the fluosilicic acid fed to the leaching stage is at least part recovered and reused.

In accordance with the present invention is the method as defined above, useful for the production of amorphous silica product, further comprising: (i) boiling said aluminum fluosilicate solution to precipitate aluminum fluoride trihydrate and whereby silicon tetrafluoride and hydrofluoric acid are evaporated; and (ii) condensating said silicon tetrafluoride and hydrofluoric acid to obtain fluosilicic acid and amorphous silica. Two thirds of the fluosilicic acid used in the process are recovered and used in the next batch.

In accordance with the present invention is the method as defined above, useful for the production of sodium silicate or potassium silicate solution, by the dissolution of said silica in caustic soda or potassium hydroxide solution, to yield sodium silicate or potassium silicate solution.

Still in accordance with the present invention is the method as defined above, useful for the production of aluminum fluoride, further comprising (i) boiling said aluminum fluosilicate solution to obtain aluminum fluoride trihydrate; and (ii) thermotreating obtained aluminum fluoride trihydrate so anhydrous aluminum fluoride is obtained.

In another preferred embodiment of the present invention is the method defined above useful for the production of aluminum sulfate product, further comprising defluorating aluminum fluosilicate solution obtained from said leaching step, by means of admixing sufficient amount of sulfuric acid with said aluminum fluosilicate solution, so aluminum sulfate product is obtained and all of the fluosilicic acid is set free and used in the next batch, preferably after a condensation step.

In another preferred embodiment of the present invention is the method defined above, useful for the production of aluminum hydroxide solid product, further comprising neutralizing aluminum sulfate obtained in the defluorating step, as defined above, with ammonium aqueous solution so aluminum hydroxide solid product and ammonium sulfate solution are simultaneously obtained.

In another preferred embodiment of the present invention is the method defined above, sodium and potassium hydroxide are used for the neutralization of the aluminum sulfate, whereby simultaneously with the production of aluminum hydroxide, sodium and potassium sulfate are obtained.

Still another preferred embodiment of the present invention is the method defined above, useful for the production of alums, which are double salts of aluminum sulfate and either sodium or potassium sulfate, further comprising precipitating said aluminum sulfate in sodium sulfate or potassium sulfate solution so alum salt product is obtained.

DETAILED DESCRIPTION OF THE INVENTION

Figure 1:
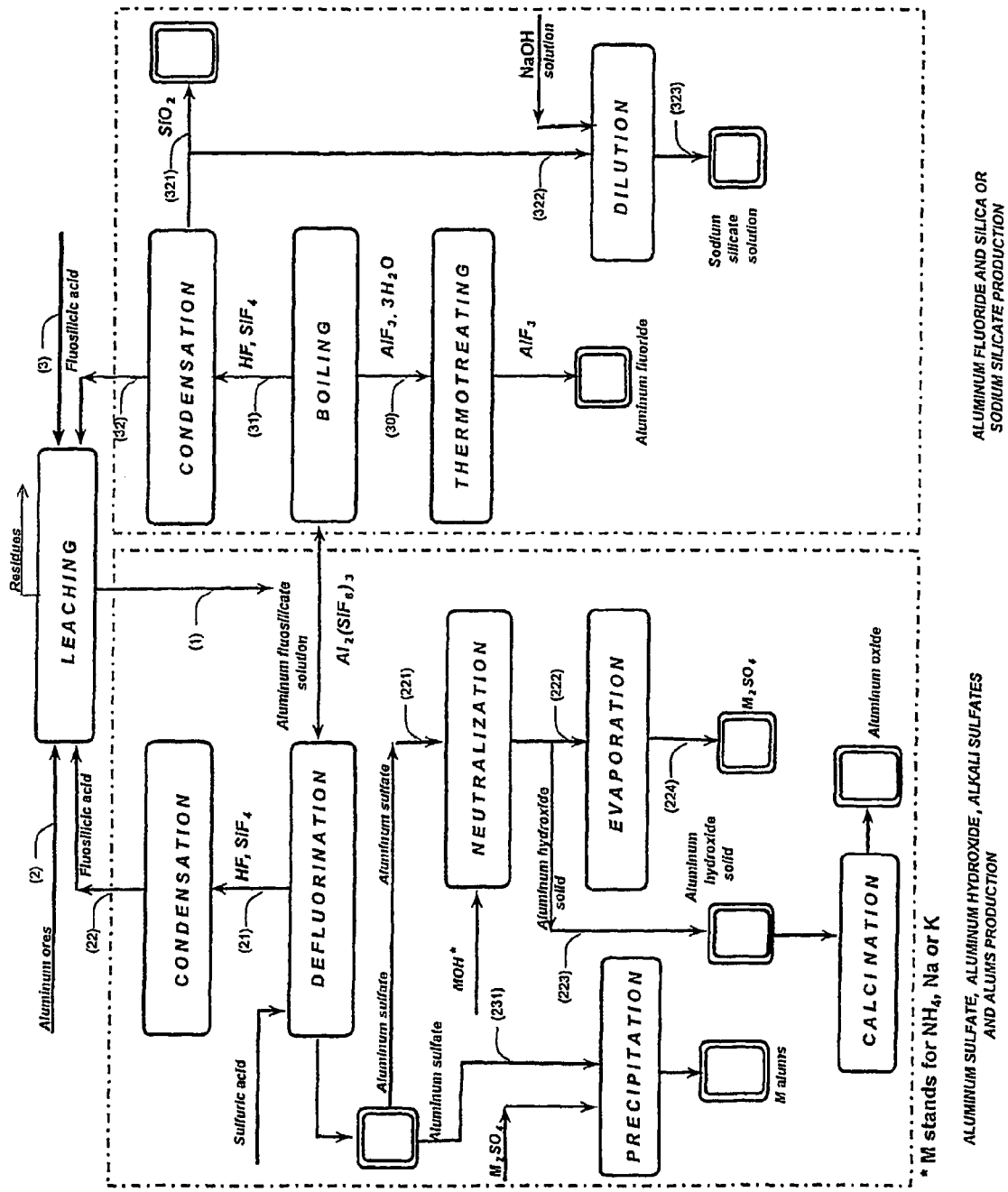
FIG. 1 describes a method for the production of aluminum compounds and silica from various ores.

It is a preferred embodiment of the present invention to provide an improved method for the production of inorganic aluminum substances and amorphous silica from raw materials selected from, clays, coal ash, bauxite and any other aluminum oxide containing ores, referred hereby in the term 'aluminum ores'.

According to the present invention, two main raw materials are used in the proposed process. The first is fluosilicic acid, a by-product of phosphoric acid and superphosphate production, which selectively leaches the aluminum oxide from the ores. Fluosilicic acid is recovered totally in the process of production of aluminum sulfate, while only two thirds of it are recovered in the process for production of aluminum fluoride. The second raw material is aluminum ores, selected from at least one of the following origins: (i) Clays, whereas the alumina component is kaolinit—an aluminum silicate, and in which the aluminum oxide constituent is soluble in the fluosilicic acid. The general formula of said clay is $Al_2O_3.2SiO_2.2H_2O$. There are other aluminum silicate clays, but the solubility of said constituent in fluosilicic acid is relatively lower. The said ores also contain other oxides, such as free silica, ferric oxide, titanium dioxide and others. (ii) Coal ash, whereas it's composition is similar to that of aforementioned clays, yet the content of oxides differs according to the source of the coal, from which the ash was produced. (iii) Bauxite, and particularly its two main kinds: the gibbsite bauxite, in which the aluminum constituent is the hydroxide $Al(OH)_3$, which is highly soluble, and boehmite—$AlO(OH)$, which is less soluble in fluorosilicic acid (iv) Any other aluminum oxide containing ore.

Reference is made now to FIG. 1, which presents, according to the present invention, a method for ore processing, comprising aluminum ores leaching at the beginning of the process, and followed by two alternative yet incorporatable production sequences:

1. Production of aluminum sulfate as a first product, from which aluminum hydroxide is obtained as a second product. The aluminum hydroxide by thermotreating yields aluminum oxide. Simultaneously, with the production of aluminum hydroxide, alkali sulfates, and alums are obtained (production sequence defined in the left panel) and,
2. Production of aluminum fluoride and silica or sodium silicate (production sequence defined in right panel).

Referring now to the first step, hereafter referred as the 'leaching', wherein according to the present patent aluminum oxide containing ores, introduced to the leaching reaction by stream 2, are selectively leached at temperature of 40° C.–80° C., and most preferably in the range of 60° C.–70° C. by solution of fluosilicic acid (introduced to the reaction by streams 3, 22 or 32, and whereby aluminum fluosilicate solution is obtained. Equation 1 schematically described aforementioned leaching reaction:

$$Al_2O_3.2SiO_2+Fe_2O_3+3H_2SiF_6=Al_2(SiF_6)_3+3H_2O+\{2SiO_2, Fe_2O_3\} \quad (1)$$

Said leaching step, according to the present invention, comprising also both filtration and washing steps. Additionally, said leaching step, according to the present invention, is selective for the aluminum oxide that dissolves in the reaction medium, wherein ferric oxide is dissolved only in a very low extent, providing iron-free grade aluminum products.

In one preferred embodiment of the present invention, at least part of the reacting fluosilicic acid is recycled from the process, by streams 22 and 32, wherein said fluosilicic acid is recovered in a condensation step, as defined below. According to particularly preferred embodiments of the present invention, about two thirds of the fluosilicic acid used in the process is recovered through stream 32 and about all fluosilicic acid in the process, is recovered by stream 22. Fresh fluosilicic acid, however, may be introduced to the leaching reaction through stream 3.

At the end of said leaching step, resulted aluminum fluosilicate is filtered from the insoluble, (stream 1) and further processed in one of at least two alternatives, as defined below.

Reference is made now to the left panel, to the box 'DEFLUORATION, wherein said aluminum fluosilicate solution is reacted exothermically with admixed sulfuric acid, yielding aluminum sulfate as product by equation 2. The temperature rises exothermally, as described above, to boiling. The fluosilicic acid is distilled off trough steam 21. After a CONDENSATION step, said fluosilicic acid is recovered through stream 22 to the consequent aforementioned LEACHING batch $$Al_2(SiF_6)_3+3H_2SO_4=Al_2(SO_4)_3+2HF+SiF_4 \quad (2)$$

Reference is made now to the right panel, wherein said aluminum fluosilicate solution is alternatively or simultaneously heated and evaporated in a BOILING operation. As a result, aluminum fluoride precipitates as the first product through stream 30, and gases containing $SiF_4$ and water vapors (stream 31) are followed to a CONDENSATION step wherein about 2 thirds of said leaching media is recycled through stream 32. In the condensation step silicon tetrafluoride, obtained by reaction (2a) reacted with water vapors by reaction (2b) to yield amorphous silica (see stream 321), a by product of the process Still referring right panel, products of said CONDENSATION step are purged at stream 322 to a DISSOLUTION step, wherein caustic soda and/or caustic potash solution is admixed to obtain comprising a sodium or potassium silicate solution by-product (stream 323).

Said amorphous silica product is widely known as commercially valuable itself, while the alkali silicate solutions are used as raw materials for the electronic and paper industry, and other markets.

Reference is made now to the right panel, wherein a stream of aluminum fluosilicate solution (1) enters a BOILING step. At least part of the stream of silicon tetrafluoride (31) and fluorosilicic acid (32) is recycled towards aforementioned CONDENSATION step. Simultaneously or alternatively, aluminum fluoride trihydrate is introduced in stream 30 to a THERMOTREATING stage, wherein anhydrous aluminum fluoride product is obtained.

In another embodiment of the present invention is a process to produce anhydrous aluminum fluoride wherein the drying stage hereto described in FIG. 1 comprises a multi-stage procedure, i.e., comprising the following drying stages: (i) drying at 110° C. to yield aluminum fluoride 3-hydrate; (ii) calcination at 250° C. to yield aluminum fluoride 0.5-hydrate and (iii) calcination at 550° C. to yield anhydrous aluminum fluoride.

Still in another embodiment of the present invention is a process to produce anhydrous aluminum fluoride whereby the calcinating stage (at 550° C.) of the hydrated aluminum fluoride, some aluminum oxide is produced. The commercial aluminum fluorides contain up to 8% of aluminum oxide at the last stage of calcinating. Aluminum fluoride produced in the present invention suits well to these definitions.

Thus, a preferred embodiment of the present invention is a process wherein by heating the aluminum fluosilicate solution aluminum fluoride precipitates and silicon tetrafluoride evaporates, as schematically described in equation 2a:

$$Al_2(SiF_6)_3 = 2AlF_3 + 3SiF_4 \quad (2a)$$

The yielded silicon tetrafluoride of aforementioned stream 321 and water are reacted as described in equation 2b bellow:

$$3SiF_4 + 2H_2O = SiO_2 + 2H_2SiF_6 \quad (2b)$$

wherein silica and fluorosilicic acid are produced by cooling. Obtained silica may be filtered, washed, and dried, and produced as a by product of the process.

Reference is made now to left panel, wherein products of said DEFLUORATION step are discharged as at least one of the following streams: (i) an aluminum sulfate product, (ii) feed stream (231) to a PRECIPITATION step and (iii) a feed stream 221 to a NEUTRAILIZATION step.

In one preferred embodiment of the present invention, ammonium hydroxide introduced to the NEUTRALIZATION step may equivalently substituted by either potassium or sodium hydroxide, whereby ammonium, sodium or potassium sulfate solution is obtained along with said aluminum hydroxide precipitate.

From aluminum sulfate, obtained by said DEFLUORATION step, aluminum hydroxide can be produced from which two different processes are possible: (i) production of aluminum hydroxide and (ii) production of aluminum oxide, which is obtained by calcination.

Referring hence to the aluminum sulfate stream (231), which is introduced with sodium sulfate or potassium sulfate to a PRECIPITATION step. Sodium or equivalent potassium alums product is hence obtained.

Alternatively or simultaneously, said aluminum sulfate is introduced by stream 221 with an ammonium aqueous solution to a NEUTRALIZATION step. The aluminum hydroxide solid product is collected in stream 223, to collect aluminum hydroxide solid product, wherein other products are feeding through steam 222 an EVAPORATION step. It is notable that aluminum oxide, which may further obtained in a calcination step from aluminum hydroxide, is a most valuable material. Since the calcination process of the aluminum hydroxide is known, it is not described in this application.

Still according to the present invention, ammonium sulfate obtained at aforementioned EVAPORATION step and collected in by stream 224 to a pure ammonium sulfate product.

According to a preferred embodiment of the present invention, sodium or potassium hydroxide is reacting with aluminum sulfate to obtain aluminum hydroxide and sodium or potassium sulfate.

It is well in the core of the present invention to re-use materials effectively and to recycle by-products. Thus, production of ammonium, potassium and sodium sulfate according to the present invention is of importance: The ammonium and the potassium sulfate are fertilizers, the sodium sulfate a reagent used in many inorganic syntheses. In addition, when a factory produces the aluminum sulfate and the alkali sulfates, it can produce alums that are high priced double salts.

According to one embodiment of the present invention, the aluminum ores are leached by fluosilicilic acid, whereas up to about 85% of the aluminum oxide is dissolved and processed to yield valuable aluminum fluoride. The residue is not dissolved and comprises silica, up to 95% of ferric oxide and about 15% of the aluminum oxide that does not dissolve by fluosilicic acid. The ferric oxide dissolves in hydrochloric or sulfuric acid whereby ferric chloride or ferric sulfate is produced. By their ammoniation ferric hydroxide pigments of various tints and fertilizer grade ammonium sulfate are produced. All these products are of commercial value.

According to the present invention said leaching stage is preferably performed at 60° C.–70° C. The insoluble are filtered off and treated as described above.

Still another embodiment of the present invention is a co-production of commercially valuable silica and the alkali silicate solutions, obtained by dissolution of the silica in caustic soda or caustic potash, are used in the electronic and paper industry, and other markets.

Lastly, in other embodiment of the present invention is said process as described in FIG. 1, wherein three moles of fluorosilicic acid are used for the leaching of aluminum oxide, whereas about all of said acid is recovered. Thus, in the production of aluminum fluoride (right panel of figure) only two moles of fluorosilicic acid are recovered and one mole of fluosilicic acid is to be added to the process from batch to batch as described in stream 3.

EXAMPLES

The composition of the clay used in the experiments 1–3 was 35.5% aluminum oxide, 53.8% silica, 9.6% ferric oxide, 0.8% calcium oxide and 0.3% magnesium oxide.

Example 1

A sample of 50.0 g of clay, comprising 35.5% of aluminum oxide, was admixed by means of magnetic stirrer with fluosilicilic acid (27.7%, 322.0 g) for 60 min at about 65° C. The slurry was filtered, and the insoluble substances were washed (54.9 g) and subsequently dried (35.0 g), the dissolution of 83% of aluminum oxide was achieved.

Filtrate comprising aluminum fluosilicate (446.0 g) was evaporated to 200 g. Obtained precipitate comprising aluminum fluoride tri-hydrate was filtered, washed (34.7 g) and dried at 110÷C to yield 25.1 g product. An amount of 22.6 g of said aluminum fluoride trihydrate product was furtherly heated for six hours at 550÷C to yield pure aluminum fluoride anhydrous (13.3 g), as was analyzed by means of X-ray diffraction analysis. This final product contained 0.1% of ferric oxide and less than 0.1% of calcium oxide, and traces of silica. 83% of the aluminum oxide from the clay was dissolved in this process, wherein the overall transfer yield of aluminum oxide from the clay to the product aluminum fluoride was 62%.

Example 2

A sample of 50.0 g of clay, comprising 35.5% of aluminum oxide was admixed by means of magnetic stirrer with fluosilicilic acid (27.7%, 330.0 g) for 60 min at about 65÷C. The slurry was filtered, and the insoluble substances were washed (55.0 g) and subsequently dried (35.2 g). Dissolution of 80.9% aluminum oxide was achieved. Aluminum fluosilicate containing filtrate (380.0 g) was evaporated to 200 g. Obtained precipitate was filtered, washed (33.8 g) and dried at 110÷ to 24.5 g product, comprising aluminum fluoride trihydrate. Said aluminum fluoride trihydrate product was first heated to 250÷C and than two hours at 550÷C to yield pure aluminum fluoride anhydrous (15.0 g) was found, as was defined by means of X-ray diffraction analysis. This product contained 0.1% of ferric oxide, less than 0.1% of calcium oxide containing residuals and traces of silica. 0.3% of the aluminum oxide present in the clay was dissolved in this process, wherein the overall transfer yield of aluminum oxide from the clay to the product aluminum fluoride was 63%.

Recycling stage: An additional sample of 50.0 g of clay was added to 330 g fluorosilicic acid (27%,), and aforementioned filtrate (200 g) was mixed by means of magnetic stirrer and heated for 60 min at about 65° C. to 185 g. The insoluble matter was filtered, washed and dried at 100° C. The product weight was 35.00 g, 82% of the aluminum oxide dissolved.

The filtrate (375.0 g) was heated, water and silicon tetrafluoride evaporated until the weight of the filtrate of 200 g was obtained. By cooling, aluminum fluoride precipitated and was filtered off, washed and dried at 110÷C to yield 38.8 g aluminum fluoride 3.0 hydrate; drying at 250° C. to yield aluminum fluoride 0.5 hydrate and then drying at 550° C., and yielded anhydrous aluminum fluoride (23.9 g). The yield of the recycling stage was 99.2%.

The overall yield of the transition of aluminum oxide to aluminum fluoride for the two parts of the experiment was 80.5%.

Example 3

Experiment as described above, wherein the evaporation of aluminum fluosilicate was performed to a smaller volume of 75 ml. The aluminum oxide from the clay was dissolved to 84.3% and by evaporation to a smaller volume the overall yield of the aluminum fluoride increased to 89.9%.

The analysis of the sample 3 was 33.0% $Al_{total}$, 63.7% F, 0.10% $Fe_2O_3$, 0.08% $SiO_2$, 0.1% CaO, corresponding to 93.9% $AlF_3$ and 5.4% $Al_2O_3$.

Example 4

A sample of coal ash containing 29.1% aluminum oxide, 45.0% silica, 3.6% ferric oxide and 7.5% calcium oxide was treated similarly as the samples of the clay. 25 g of the sample were mixed for 2 hours at 65° C. with 130 g of fluosilicic acid (25.8%) but because of the presence of calcium oxide, 3.2 g of sulfuric acid was added to produce insoluble calcium sulfate, which was filtered off together with the insoluble of the coal ash sample. The weight of the insoluble and gypsum after drying was 21.1 g. Dissolution of 89% of the aluminum oxide was achieved.

The weight of the filtrate containing the aluminum fluosilicate was 296 g. By evaporating to 75 g a precipitate of aluminum fluoride trihydrate was obtained, which after drying weighed 14.5 g. The yield of the transition of the aluminum oxide to fluoride was 73%. 83% of the dissolved aluminum oxide was transformed to aluminum fluoride.

Since samples of clay and coal ash differ from source to source some changes in the procedure may occur, but the two principles of (a) production of aluminum fluosilicate and (b) evaporation to precipitation of aluminum fluoride will grant the process for most of raw materials. Example is given in Example 4 in which the calcium oxide was removed by sulfuric acid.

Example 5

A sample of bauxite containing 56.5% aluminum oxide, 7.6% silica, 0.1% ferric oxide, 2.5% titanium oxide and 26.1% LOI was treated similarly as the samples of the clay.

25 g of the sample were mixed for 80 minutes at 60° C. with 320 g of fluosilicic acid (27.9%). The slurry filtered off. The weight of the cake that does not dissolve after drying was 9.1 g. 15.9 g from the 25 g dissolves, wherein the content of the aluminum oxide was 6.5 g: 25×0.565 g=14.1 g, LOI=6.5. The percentage of dissolved aluminum oxide was calculated to 76.9%.

Example 6

The composition of the bauxite sample: 36.9% $AlO_2$; 1.73% $SiO_2$; 35.8% $Fe_2O_3$; 3.03% $TiO_2$; 0.29% $SO_4$ and 21.0% LOI.

25 g of the sample was reacted with 168 g of fluosilicic acid (28% $H_2SiF_6$) by mixing in a beaker by a magnetic stirrer at a temperature of 60° C. for 2 hours, and than the slurry was filtered. The cake that was not dissolved weighed 23.4 g, and 12.8 g after drying. 12.2 g of the sample was dissolved. If all of the soluble matter would dissolve, the sum would be 25×(0.369+0.21+0.03)=15.2 g. It was thus calculated that the percentage of dissolved $Al_2O_3$=12.2×100/15.2=80.3%.

Example 7

Clay composition containing: 35.5% $Al_2O_3$, 45.5% $SiO_2$, 9.6% $Fe_2O_3$, 1.6% $TiO_2$, 0.8CaO, 0.3% MgO.

To 25 g of the above clay composition were added 145.7 g fluosilicic acid (25.8% $H_2SiF_6$, containing colloidal silica, obtained from a previous batch of clay). The suspension was heated for 60 minutes from 40° C.–80° C. The suspension was cooled and the insolubles were filtered off and washed. The weight of the wet cake was 31.34 g and, after drying, 18.04 g. The weight of the filtrate containing washings was 195 g, the content of said filtrate being 17.1% $Al_2(SiF_6)_3$, 3.9% $H_2SiF_6$, and 0.020% $Fe_2O_3$ (the presence of titanium dioxide, calcium oxide, and magnesium oxide was not recorded). To the filtrate containing the aluminum fluosilicate, 160 g sulfuric acid (95%) was added within 30 minutes. The suspension was heated to evaporate water and fluosilicic acid. The remaining solution contained 60% $H_2SO_4$ and was then cooled to 25° C. The crystals of aluminum sulfate precipitated, were filtered off, and washed with 20 ml of a saturated aluminum sulfate solution. The weight of the crystals produced was 45 g. Analysis of the product showed $Al_2(SO_4)_3$*$18H_2O$.

Dissolution of 79% of the aluminum oxide of the clay was achieved and from practically all of the dissolved aluminum oxide aluminum sulfate was obtained. This is due to the large excess of sulfuric acid used to achieved the precipitation from 60% H2SO4 in which the solubility of the aluminum sulfate is 1%. The excess of the used sulfuric acid do not losses, because it is used in the next batch.

Example 8

The coal ash composition: 29.1% $Al_2O_3$, 45.0% $SiO_2$, 7.5% CaO, 0.97% MgO, 3.6% $Fe_2O_3$ and 1.6% $TiO_2$.

To 25 g of the above coal ash composition, 201 g of 25.8% $H_2SiF_6$ from a previous batch were added. The suspension was stirred for 2 hours at a temperature of 50° C.–60° C. The suspension was then cooled, and the insoluble matter was filtered off and washed. The weight of the wet cake was 26.7 g, and after drying, 17.5 g. The weight of the filtrate and the washings, containing aluminum fluosilicate, was 296 g. 10 g sulfuric acid solution (95%) were added, within half an hour, to the aluminum fluosilicate solution and the solution was heated to 100÷C. Acidic gases HF and $SiF_4$ were released and after cooling, they were obtained as fluosilicic acid, and ready to be used for the next batch. The weight of the obtained fluosilicic acid was 200 g, and the concentration of the solution was 24.8% $H_2SiF_6$.

The aluminum sulfate solution contained sulfuric acid and a small precipitate, which was filtered off and, after drying, found to contain 4 g calcium sulfate. The sulfuric acid and aluminum sulfate solution was then concentrated to 60% $H_2SO_4$. The solution was cooled to 25° C., and 35 g of aluminum sulfate were precipitated and filtered off. The salt is $Al_2(SO_4)_3*18H_2O$ which precipitates from a 60% $H_2SO_4$ solution. The aluminum sulfate contained 90 ppm iron substances.

The cake, which did not dissolve by the action of the fluosilicic acid, contained all of the ferric oxide of the coal ash (3.6%), as stated in the above composition.

What is claimed is:

1. A method of treating an aluminum oxide containing source, the method comprising: (a) providing the aluminum oxide containing source; (b) leaching the aluminum oxide containing source with fluosilicic acid in a leaching stage, to obtain an aluminum fluosilicate solution and a solid residue; (c) separating said aluminum fluosilicate solution from said residue, and (d) defluorinating said aluminum fluosilicate solution by heating said solution with sulfuric acid.

2. A method of treating an aluminum oxide containing source, the method comprising:
(a) providing the aluminum oxide containing source; (b) leaching the aluminum oxide containing source with fluosilicic acid in a leaching stage, to obtain an aluminum fluosilicate solution and a solid residue; (c) separating said aluminum fluosilicate solution from said residue, and (d) boiling said solution, subsequent to said separating of said aluminum fluosilicate solution from said residue, so as to evaporate silicon tetrafluoride.

3. The method according to claim 2, wherein said aluminum oxide containing source is selected from the group consisting of clays, coal ash and bauxite.

4. The method according to claim 1, wherein said leaching is performed within a temperature range of 40° C. to 80° C.

5. The method according to claim 1, wherein said leaching is performed within a temperature range of 60° C. to 70° C.

6. The method according to claim 2, wherein the source contains at least one impurity containing a material selected from the group consisting of silicon, iron, and oxides thereof, and wherein, in said residue contains at least a portion of said at least one impurity.

7. The method according to claim 6, wherein said at least one impurity includes ferric oxide, said ferric oxide being substantially insoluble in said leaching stage.

8. The method according to claim 6, wherein said at least one impurity includes silica, said silica being substantially insoluble in said leaching stage.

9. The method according to claim 2, wherein a weight ratio of fluosilicic acid to alumina in feed materials in said leaching stage is above 3.0 to 1.

10. The method according to claim 2, wherein a weight ratio of fluosilicic acid to alumina in feed materials in said leaching stage is above 4.0 to 1.

11. The method according to claim 2, wherein said boiling is performed so as to precipitate aluminum fluoride trihydrate.

12. The method according to claim 2, useful for the production of aluminum fluoride, further comprising:
boiling said aluminum fluosilicate solution to obtain aluminum fluoride trihydrate precipitate; and thermotreating said precipitate to obtain anhydrous aluminum fluoride.

13. The method according to claim 1, useful for the production of aluminum sulfate product, wherein said defluorinating of said aluminum fluosilicate solution is performed by admixing a sufficient amount of said sulfuric acid with said aluminum fluosilicate solution, so as to obtain a solid hydrated aluminum sulfate product.

14. The method according to claim 2, further comprising:
reacting said silicon tetrafluoride with water to produce silica.

15. The method according to claim 13, further comprising:
regenerating fluosilicic acid for recycling to said leaching stage.

* * * * *